(12) United States Patent
Miya (10) Patent No.: US 7,235,966 B2
(45) Date of Patent: Jun. 26, 2007

(54) RESOLVER UNIT AND RESOLVER USING SAME

(75) Inventor: Taiichi Miya, Ota-ku (JP)

(73) Assignee: Minebea, Co., Ltd., Kitasaku-gun, Nagano (JP)

( * ) Notice: Subject to any disclaimer, the term of this patent is extended or adjusted under 35 U.S.C. 154(b) by 0 days.

(21) Appl. No.: 11/301,025

(22) Filed: Dec. 13, 2005

(65) Prior Publication Data

US 2006/0176051 A1  Aug. 10, 2006

(30) Foreign Application Priority Data

Feb. 10, 2005  (JP) .............................. 2005-035319

(51) Int. Cl.
*G01B 7/30* (2006.01)
*H01F 5/00* (2006.01)

(52) U.S. Cl. .......................... 324/207.25; 324/207.18; 318/661

(58) Field of Classification Search ........... 324/207.25, 324/207.18; 318/661
See application file for complete search history.

(56) References Cited

FOREIGN PATENT DOCUMENTS

| | | |
|---|---|---|
| EP | 1 408 309 A1 | 4/2004 |
| JP | 57-52639 A | 3/1982 |
| JP | 5-10779 A | 1/1993 |
| JP | 8-136211 A | 5/1996 |
| JP | 2002-139348 | 5/2002 |

*Primary Examiner*—Reena Aurora
(74) *Attorney, Agent, or Firm*—Foley and Lardner LLP (57) ABSTRACT

A resolver unit having a structure in which the axial length is shortened to prevent the magnetic coupling characteristic between the rotary and stationary sides from being impaired, a winding generates more magnetic fluxes, and multiplexing is easily conducted, and also a resolver using such a resolver unit are provided.

8 Claims, 8 Drawing Sheets

RESOLVER UNIT AND RESOLVER USING SAME

BACKGROUND OF THE INVENTION

1. Technical Field of the Invention

The present invention relates to a resolver unit which detects a rotational position, and a resolver using it, and more particularly to a resolver unit which has transformer windings, and in which the axial length is shortened, and a resolver using it.

2. Description of the Related Art

Figure 6:
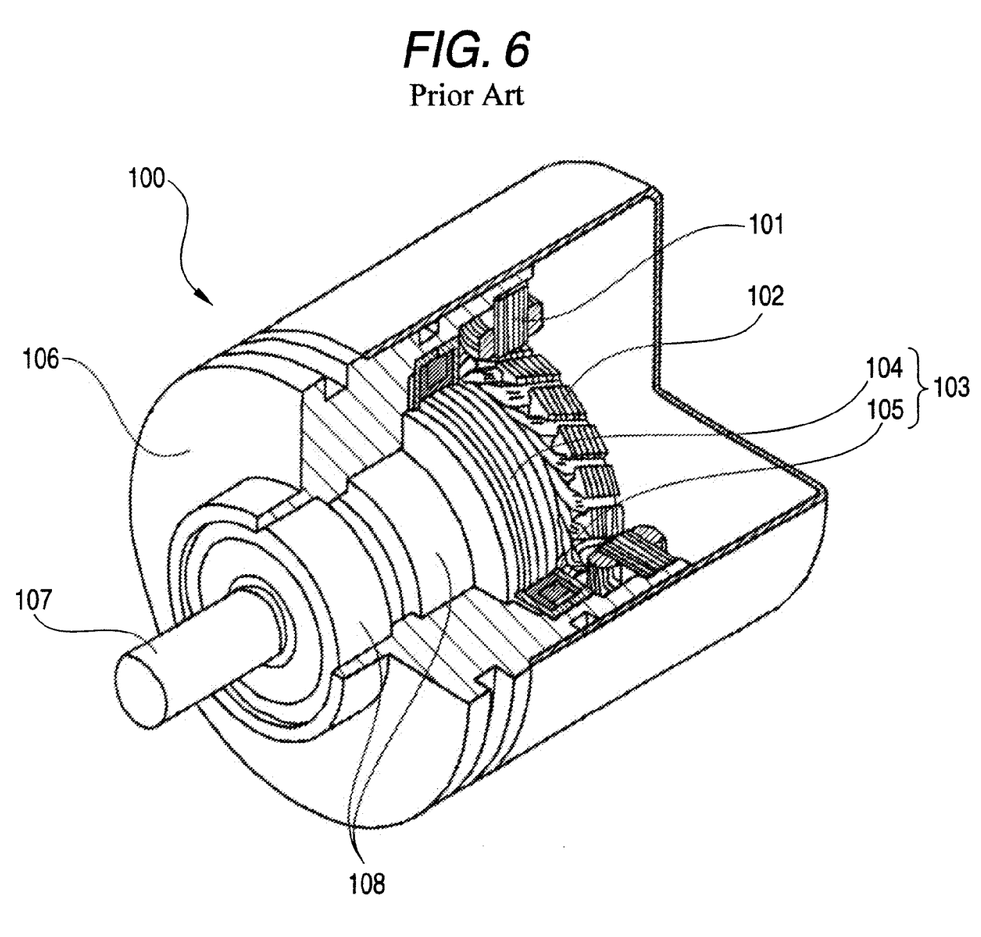
FIG. 6 is a fragmentary sectional view of a related art resolver having a cylindrical stator assembly, and a rotor assembly which is placed coaxially with the cylindrical stator assembly.

FIG. 6 shows a related art resolver comprising transformer windings for a power supply.

FIG. 6 is a fragmentary sectional view of the related art resolver having a cylindrical stator assembly, and a rotor assembly which is placed coaxially with the cylindrical stator assembly.

In FIG. 6, the resolver 100 comprises the cylindrical stator assembly 101, the rotor assembly 102 which is placed coaxially with the stator assembly 101, and a transformer portion 103.

The transformer portion 103 has an inner core 104, and an outer core 105 which is placed coaxially with the inner core.

A stator portion has a structure in which the outer core 105 and the stator assembly 101 are axially built in a cylindrical housing 106.

A rotor portion has a structure in which the inner core 104 and the rotor assembly 102 are axially built in a shaft 107.

In the transformer portion 103, a winding of the inner core 104 is connected to a rotor winding of the rotor assembly 102 by a crossover wire. Winding portions of the resolver are coaxially placed. In order to prevent the shaft from being eccentric, therefore, two bearings 108 are placed with being axially separated from each other.

In the example shown in FIG. 6, the inner core 104, the rotor assembly 102, and the two bearings 108 are continuously disposed in the axial direction. Consequently, the axial length is prolonged, and the stator assembly 101 and the rotor assembly 102 which are cylindrically placed, and the inner core 104 and the outer core 105 have a complicated structure, thereby causing a problem that the whole resolver cannot be miniaturized.

In order to shorten the axial direction, therefore, a disk type resolver or a flat type resolver has been proposed (for example, JP-A-8-136211 and JP-A-5-010779, hereinafter referred to "JPA'211" and "JPA'779" respectively).

Figure 7:
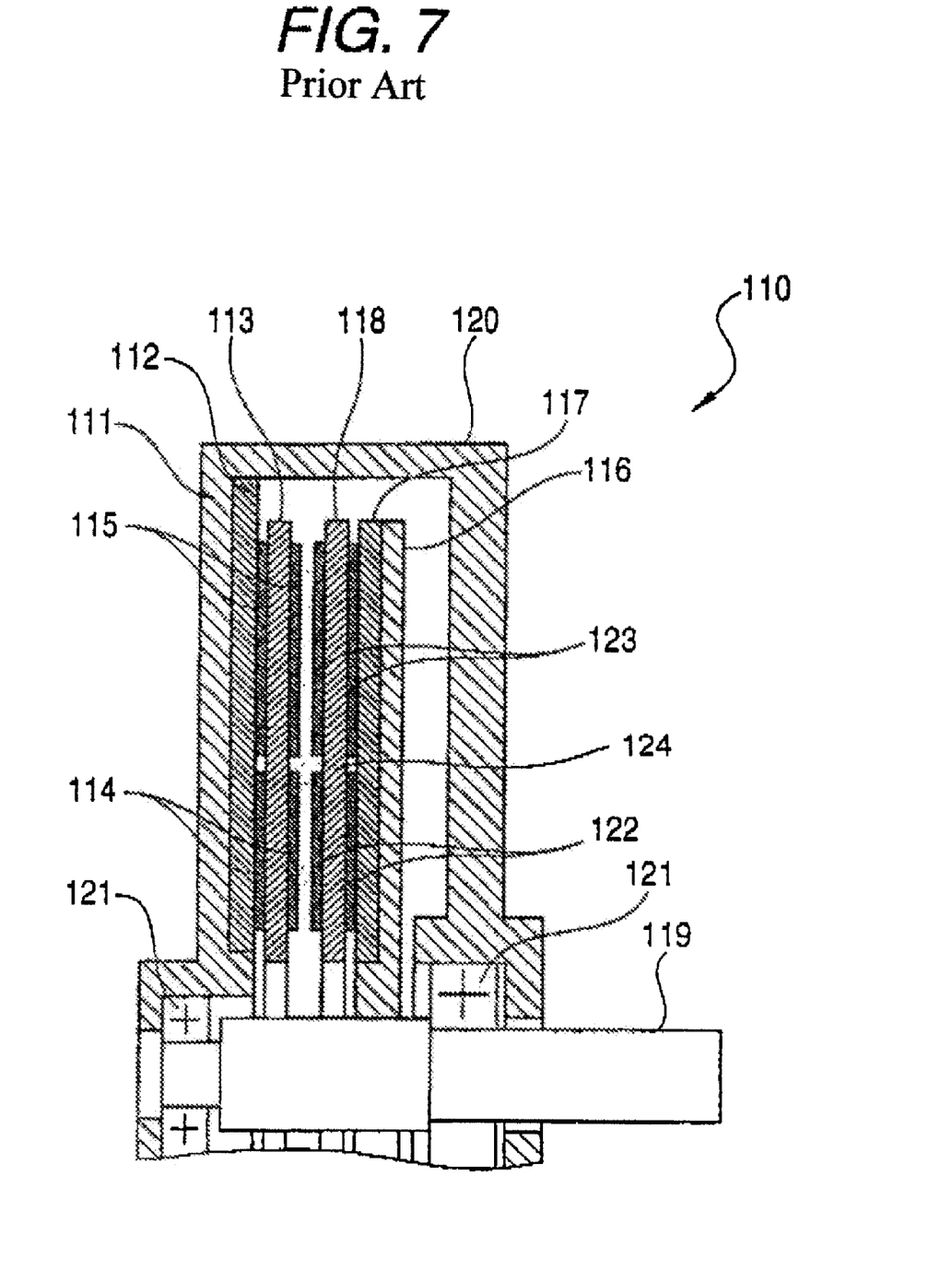
FIG. 7 is a sectional view of a related art flat type resolver which is shown in JPA'211.

FIG. 7 is a sectional view of a related art flat type resolver which is described in below.

In FIG. 7, the stationary side has a stationary core 111 and a stationary sheet coil 113.

The stationary core 111 comprises a magnetic plate 112 which is made of a material having an excellent high-frequency iron loss characteristic, such as disk-like ferrite.

The stationary sheet coil 113 is fixed to a side face of the magnetic plate 112 by an adhesive agent or the like. In the stationary sheet coil 113, a primary winding 114 of a rotary transformer portion A, and a detection winding 115 of a signal generating portion B are formed from a flat plate-like conductor by a printed wiring produced with etching, printing, or a press work, and bonded to the front and rear faces of a disk-like insulating substrate made of polyimide. An insulating process using a polyimide resin or the like is applied over the surface of the conductor.

The rotary side has a rotary core 116 and a rotary sheet coil 118, and is fixed to a shaft 119. The rotary core 116 is a disk-like core which is opposed to the stationary core 111 via an air gap, and comprises a magnetic plate 117 in the same manner as the stationary core 111.

The rotary core 116 is fixed to the shaft 119 at the center, and supported via a bearing 121 by a bracket 120 fixed to the stationary core 111.

The rotary sheet coil 118 is fixed to a side face of the magnetic plate 117 by an adhesive agent or the like. In the rotary sheet coil 118, a secondary winding 122 of the rotary transformer portion A, and an exciting winding 123 of the signal generating portion B are similarly formed by a printed wiring, and bonded to the front and rear faces of a disk-like insulating substrate 124 made of polyimide. An insulating process using a polyimide resin or the like is applied over the surface of the conductor. In the case where the fixation of the stationary core 111 and the stationary sheet coil 113, and that of the rotary core 116 and the rotary sheet coil 118 are conducted by an adhesive agent, the adhesive agent has a thickness of about 25 μm, and hence the magnetic air gap is increased. This causes the power consumption to be increased.

The related art flat type resolver of FIG. 7 has the following problems.

(1) In the case where the fixation of the stationary core 111 and the stationary sheet coil 113, and that of the rotary core 116 and the rotary sheet coil 118 are conducted by an adhesive agent, the adhesive agent has a thickness of about 25 μm. Therefore, the stationary sheet coil 113 may be attached with being inclined with respect to the face of the stationary core 111 by a thick layer of the adhesive agent, or the rotary sheet coil 118 may be attached with being inclined with respect to the face of the rotary core 116 by a thick layer of the adhesive agent. In such a case, the gap between the rotary and stationary sides cannot be made uniform, and there is a problem in that the magnetic coupling characteristic between the rotary and stationary sides is distorted by a degree corresponding to the inclination.

(2) The surface of each conductor is provided with the insulating process using a polyimide resin or the like. Therefore, the thickness of the resin layer on the conductor causes the gap between the rotary and stationary sides not to be uniformly formed, and the axial length between the rotary and stationary sides is prolonged. Consequently, there is a problem in that the magnetic coupling characteristic between the rotary and stationary sides is impaired.

(3) The primary winding 114 of the rotary transformer portion A, and the detection winding 115 of the signal generating portion B are supported on the magnetic plate 112, and the secondary winding 122 of the rotary transformer portion A, and the exciting winding 123 of the signal generating portion B are supported on the magnetic plate 117. Magnetic members forming the magnetic path are restricted to only the magnetic plates 112 and 117 on the both sides.

Therefore, the distance from the winding on one side to the magnetic plate on the other side is relatively long. When the number of rotations is decreased and the output power of the transformer is reduced, consequently, magnetic fluxes crossing the magnetic plates 112 and 117 are hardly produced. Hence, a magnetic path which forms magnetic fluxes effectively interlinking with the secondary winding 122 and the detection winding 115 is insufficient, and leakage magnetic fluxes are increased.

Since each winding is formed from a flat plate-like conductor by a printed wiring produced with etching, printing, or a press work, the number of turns cannot be increased. Therefore, it is difficult to increase magnetic fluxes generated by the winding.

Consequently, it has been requested to develop a resolver in which the axial length is shortened so as not to impair the magnetic coupling characteristic between the rotary and stationary sides, and a winding generates a large number of magnetic fluxes. JP-A-57-052639 (hereinafter referred to "JPA'639" shows an example which serves as a reference.

Figure 8:
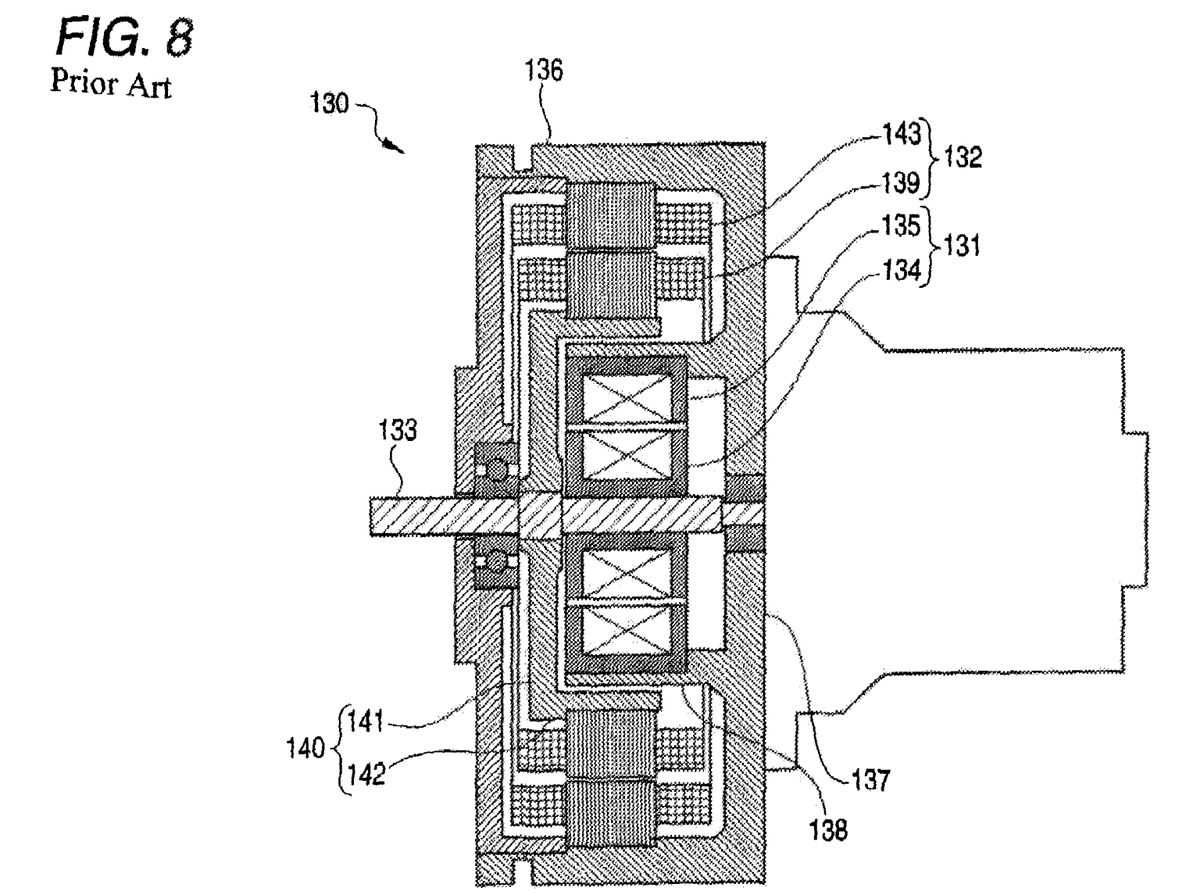
FIG. 8 is a view showing the configuration of an example disclosed in JPA'639.

FIG. 8 is a view showing the configuration of the example disclosed in JPA'639.

In a resolver 130 of FIG. 8, a rotary transformer 131 and a resolver body 132 are concentrically placed around a rotation shaft 133 with placing the rotary transformer in the inner side and the resolver body in the outer side, thereby reducing the thickness of the resolver 130. A rotor portion 134 of the rotary transformer 131 is fixed to the rotation shaft 133, and a stator portion 135 is fixed to an annular stator portion support member 138 which is inwardly projected from an end plate portion 137 of a case 136. A rotor portion 139 of the resolver body 132 is fixed to a rotor portion support member 140 which is supported integrally by the rotation shaft 133, and a stator portion 143 of the resolver body 132 is fixed to the case 136. The rotor portion support member 140 comprises a disk portion 141 fixed to the rotation shaft 133, and an annular portion 142 which is continuously disposed on the circumference of the disk portion 141.

(1) In the resolver of FIG. 8, in the direction from the center axis to the radially outer side, the rotor portion 134 of the rotary transformer 131 disposed on the rotation shaft 133, the stator portion 135 of the rotary transformer 131 disposed on the stator portion support member 138, the rotor portion 139 of the resolver body 132 disposed on the rotor portion support member 140, and the stator portion 143 of the resolver body 132 disposed on the case 136 are placed in this order. In this configuration, gaps are produced between the rotor portion 134 of the rotary transformer 131 and the stator portion 135, between the stator portion support member 138 and the rotor portion support member 140, and between the rotor portion 139 of the resolver body 132 and the stator portion 143. These gaps are hardly kept to respective appropriate values because the number of the gaps is large.

(2) In order to supply the electric power generated in the rotary transformer 131 to an exciting coil of the resolver body 132, a coil winding of the rotor portion 134 of the rotary transformer 131 is connected to that of the rotor portion 139 of the resolver body 132 by a crossover wire. The crossover wire is extended along the rotor portion support member 140. Since the length of the crossover wire is large, the crossover wire is susceptible to the wind pressure during rotation, and also to vibrations during rotation. Therefore, damage such as breakage easily occurs in the crossover wire.

(3) In order to couple the rotor portion 139 of the resolver body 132 and the rotor portion 134 of the rotary transformer 131 in a predetermined relationship, the rotor portion 139 of the resolver body 132 is disposed on the rotor portion support member 140, the rotor portion 134 of the rotary transformer 131 is disposed on the rotation shaft 133, and the rotor portion support member 140 and the rotation shaft 133 are coupled together.

As the minimum configuration for forming a resolver, a configuration where the case 136 in which the stator portions 135, 143 are disposed, and the rotor portion support member 140 in which the rotor portions 134, 139 are disposed, and the rotation shaft 133 are coupled together is required. Even when multiplexing is considered on the basis of the minimum configuration, such multiplexing is hardly realized because means for coupling the rotation shaft is problematic.

SUMMARY OF THE INVENTION

It is an object of the invention to provide a resolver unit having a structure in which, in view of the above-discussed problems, the axial length is shortened to prevent the magnetic coupling characteristic between the rotary and stationary sides from being impaired, a winding generates more magnetic fluxes, and multiplexing is easily conducted, and also a resolver using such a resolver unit. In order to attain the object, the invention employs the following configuration.

(1) A resolver unit comprising:

an inner frame in which a cylinder portion is continuously disposed on a periphery of a disk portion;

an outer frame in which an outer cylinder portion is continuously disposed on an outer periphery of an annular plate portion, and an inner cylinder portion is continuously disposed on an inner periphery of said annular plate portion;

a rotary transformer comprising an outer portion and an inner portion, wherein said outer portion comprises an annular outer transformer coil and an annular outer transformer yoke, and said inner portion comprises an annular inner transformer coil and an annular inner transformer yoke;

a resolver body comprising an inner portion and an outer portion, wherein said inner portion comprises a plurality of inner magnetic pole portions having an inner coil on an annular inner yoke, and said outer portion comprises a plurality of outer magnetic pole portions having an outer coil on an annular outer yoke, wherein said outer and inner portions of said rotary transformer are paired and opposingly placed, said outer and inner portions of said resolver body are paired and opposingly placed, one of said outer portion of said rotary transformer and said outer portion of said resolver body is disposed on a radially inner side face of said cylinder portion of said inner frame, one of said inner portion of said rotary transformer and said inner portion of said resolver body is disposed on a radially outer side face of said inner cylinder portion of said outer frame, said one being paired with and opposed to said outer portion which is disposed on said radially inner side face of said cylinder portion of said inner frame, the other one of said inner portion of said rotary transformer and said inner portion of said resolver body is disposed on a radially outer side face of said cylinder portion of said inner frame, said other one being not paired with said outer portion which is disposed on said radially inner side face of said cylinder portion of said inner frame, and one of said outer portion of said rotary transformer and said outer portion of said resolver body is disposed on a radially inner side face of said outer cylinder portion of said outer frame, said one being paired with and opposed to said inner portion which is disposed on said radially outer side face of said cylinder portion of said inner frame.

(2). The resolver unit according to (1), wherein said outer and inner portions of said resolver body, and said outer and inner portions of said rotary transformer are continuously placed in a space between a face of said disk portion and a face of said annular plate portion.

(3). A resolver which uses a resolver unit according to (1) or (2), wherein a shaft is disposed in said disk portion, said outer cylinder portion is disposed in a housing, and said shaft is rotatably disposed in said housing.

(4). The resolver according to (3), wherein said housing comprises:

an upper plate portion having an annular projection and an upper flange;

an upper housing which upstands on said upper plate portion, and which comprises a side wall portion having a lower flange in an open end;

a cylinder portion to which one of said inner and outer frames of said resolver unit is fixed; and a lower housing having a substrate flange opposed to said lower flange, wherein a shaft is disposed on said upper plate portion, and fixes the other one of said inner and outer frames of said resolver unit.

(5). A resolver in which multiple resolver units according to (1) or (2) are combined to integrally operate, wherein adjacent ones of resolver units are coupled together at one of said annular plate portions and said disk portions, next adjacent ones of resolver units are coupled together at the other one of said annular plate portions and said disk portions, and then a required number of resolver units are similarly coupled together.

(6). A resolver in which multiple resolver units according to (1) or (2) are combined to integrally operate, wherein in accordance with a degree of multiplexing, a required number of unit configurations each of which includes said outer frame, and in each of which placement relationships among said outer and inner portions of said resolver body, and said outer and inner portions of said rotary transformer that are continuously placed in a space between a face of said disk portion and a face of said annular plate portion are fixed are continuously disposed in a radial direction, a radius of said disk portion of said inner frame is elongated in accordance with a radial outward order of said unit configuration, and a width of said cylinder portion of said inner frame is increased by a degree of a plate thickness in accordance with the radial outward order of said unit configuration.

(7). A resolver wherein multiple resolvers according to (6) are disposed in the axial direction.

(8). A resolver according to (4), wherein an arbitrary number of said upper housings in each of which said resolver unit is housed in an internal space are coupled together, and an open end of a last one of said upper housings is sealed by said lower housing.

The resolver unit of one embodiment of the invention can be configured by disposing the inner or outer portion of the resolver body and the outer or inner portion of the rotary transformer, on the inner frame to form a provisional assembly, disposing the remaining portions on the outer frame to form a provisional assembly, and mutually positioning the two provisional assemblies. Therefore, the resolver unit can be directly attached to a target apparatus, whereby the resolver unit can be used.

In the resolver unit of the invention, it is preferable that the cylinder portion of the inner frame in which the inner portion of the resolver body is disposed on the outer side face and the outer portion of the rotary transformer is opposed to the inner side face is placed between the outer portion of the resolver body disposed on the outer cylinder portion of the outer frame and the inner portion of the rotary transformer disposed on the inner cylinder portion of the same outer frame. Therefore, gaps are restricted to two gaps or the gap between the outer and inner magnetic poles of the resolver body, and that between the outer and inner portions of the rotary transformer. The number of gaps can be made smaller than that in the example disclosed by JPA'639.

In the resolver unit of the invention, it is preferable that the cylinder portion of the inner frame in which the inner portion of the rotary transformer is disposed on the outer side face and the outer portion of the resolver body is opposed to the inner side face is placed between the outer portion of the rotary transformer disposed on the outer cylinder portion of the outer frame and the inner portion of the resolver body disposed on the inner cylinder portion of the same outer frame. Therefore, gaps are restricted to two gaps or the gap between the outer and inner magnetic poles of the resolver body, and that between the outer and inner portions of the rotary transformer. The number of gaps can be made smaller than that in the example disclosed by JPA'639, and the gap adjustment can be easily conducted.

In the resolver of the invention, it is preferable that when the inner frame is fixed, the outer frame is movable, and the outer portion of the rotary transformer and the inner portion of the resolver body are opposingly disposed on the front and rear faces of the cylinder portion of the inner frame, a winding of the transformer coil disposed in the outer portion of the rotary transformer can be connected by a short crossover wire to a winding of the inner coil disposed in the inner portion of the resolver body via the inner frame and the outer transformer yoke. Accordingly, a damage of the crossover wire due to vibrations, a wind pressure, or the like can be suppressed to a small degree.

In the resolver of the invention, it is preferable that the inner frame is fixed, the outer frame is movable, and the inner portion of the rotary transformer and the outer portion of the resolver body are opposingly disposed on the front and rear faces of the cylinder portion of the inner frame. Therefore, a winding of the transformer coil disposed in the inner portion of the rotary transformer can be connected by a short crossover wire to a winding of the outer coil disposed in the outer portion of the resolver body via the inner frame and the inner transformer yoke. Accordingly, a damage of the crossover wire due to vibrations, a wind pressure, or the like can be suppressed to a small degree.

In the resolver using a resolver unit of the invention, it is preferable that the disk portions of the inner frames or the annular plate portions of the outer frames are coupled together, whereby multiplexing in the axial or radial direction is easily conducted.

In the resolver of the invention, it is preferable that all the configurations of the resolver body and the rotary transformer are accommodated between a face formed by the disk portion of the inner frame and that formed by the annular plate portion of the outer frame. Therefore, multiplexing can be conducted by using the disk portion or the annular plate portion.

The invention is preferably configured by: the upper housing having the upper and lower flanges; the cylinder portion to which one of the inner and outer frames of the resolver unit is fixed; and the lower housing having the substrate flange opposed to the lower flange. The shaft fixing another one of the inner and outer frames of the resolver unit is disposed on the upper plate portion, the other one being not fixed to the cylinder portion, an arbitrary number of the upper housings in each of which the resolver unit is housed in an internal space are coupled together, and the open end of the last one of the upper housings is sealed by the lower housing. Therefore, even a single resolver or a multiplexed resolver can be easily configured.

DETAILED DESCRIPTION OF THE INVENTION

Embodiments of the invention will be described in detail with reference to the figures.

A resolver of the invention includes a single resolver in which one resolver unit is incorporated, and a multiplexed resolver in which plural resolver units are integrally combined with one another.

Embodiment 1

Figure 1A:
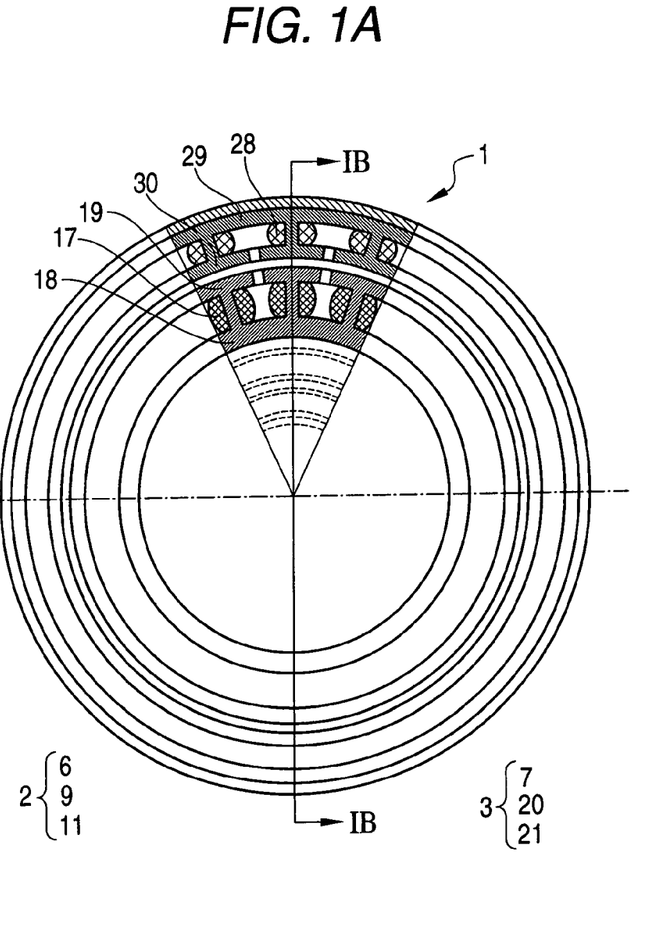
FIGS. 1A and 1B are views showing the configuration of a resolver unit of an embodiment of the invention.
Figure 1B:
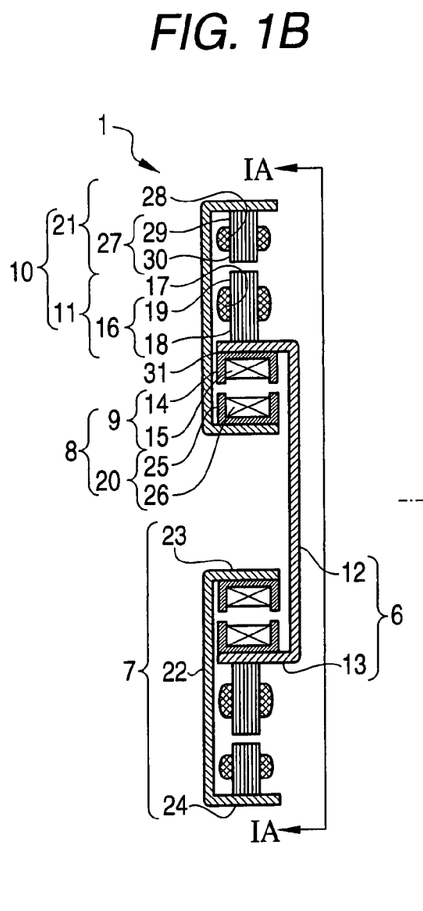
Figure 1C:
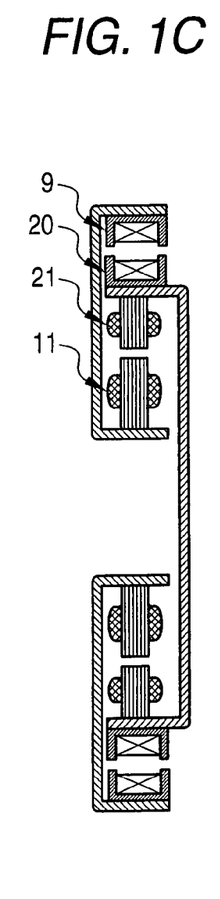
FIG. 1C is a view showing modified embodiment of FIG. 1B.

FIGS. 1A and 1C are views showing the configuration of a resolver unit of the invention.

FIG. 1A is a front view as seen from a line IA—IA of FIG. 1B in which a predetermined center angle range is a correct front view, and the remaining center angle range is a schematic view showing a structure where the resolver unit is mainly formed into a circular.

FIG. 1B is a sectional view showing a section taken along a line IB—IB of FIG. 1A, but in which its background is omitted to clarify the configuration. Hereinafter, a sectional view is similarly shown.

The resolver unit 1 of FIGS. 1A and 1B is configured by an inner structure body 2 which is relatively on the centripetal side, and an outer structure body 3 which is on the centrifugal side, and serves as a unit basic structure in multiplexing.

An arbitrary one of the inner structure body 2 and the outer structure body 3 may be set to a stationary side. When the stationary side is once determined, the other structure body may be set to a movable side in accordance with the determination. The resolver unit 1 of the invention can be configured by combining and positioning the two members of the inner structure body 2 and the outer structure body 3. The inner structure body 2 and the outer structure body 3 can be configured as a resolver by the minimum structure by, for example, directly disposing an inner frame 6 and an outer frame 7 respectively on opposing apparatuses, i.e., a rotation member (not shown) such as a shaft of a motor, a power transmission shaft, or a shaft of an operation handle, and a support member (not shown) which is opposed to the rotation member, such as a housing of the motor, a case of the power transmission shaft, or a case for guiding the shaft of the operation handle.

The inner structure body 2 is configured by the inner frame 6, an outer portion 9 of a rotary transformer 8, and an inner portion 11 of a resolver body 10.

The resolver body 10 includes a coil from which an electric signal corresponding to a rotation angle is taken out, a core, etc.

The inner frame 6 is configured by a disk-like disk portion 12, and a cylindrical cylinder portion 13 which is continuously disposed on the periphery of the disk portion 12.

The outer portion 9 of the rotary transformer 8 is configured by: an outer transformer yoke 14 that has a substantially U-like sectional shape in which an opening is centrally directed, and that is annular in a front view; and an outer transformer coil 15 that is placed in an annular recess of the outer transformer yoke 14 and having a substantially U-like sectional shape.

The inner portion 11 of the resolver body 10 is configured by an inner core 16 and an inner coil 17.

The inner core 16 is configured by an annular inner yoke portion 18, and plural inner magnetic pole portions 19 which are projected from the outer periphery of the inner yoke portion 18. The inner core 16 is made by a magnetic material such as stacked steel plates.

The outer structure body 3 is configured by the outer frame 7, an inner portion 20 of the rotary transformer 8, and an outer portion 21 of the resolver body 10.

The outer frame 7 is configured by: an annular plate portion 22 formed by an annular plate; a cylindrical inner cylinder portion 23 in which one end face is continuously disposed on the inner periphery of the annular plate portion 22; and a cylindrical outer cylinder portion 24 in which one end face is similarly continuously disposed on the outer periphery of the annular plate portion 22.

The inner portion 20 of the rotary transformer 8 is configured by: an inner transformer yoke 25 that has a substantially U-like sectional shape in which an opening is directed in the radially outward direction, and that is annular in a front view; and an inner transformer coil 26 that is placed in an annular recess of the inner transformer yoke 25 and having a substantially U-like sectional shape.

The outer portion 21 of the resolver body 10 is configured by an outer core 27 and an outer coil 28. The outer core 27 is configured by an annular outer yoke portion 29, and plural outer magnetic pole portions 30 which are projected from the inner periphery of the outer yoke portion 29. The outer core 27 is made by a magnetic material such as stacked steel plates.

A crossover wire 31 which connects the outer transformer coil 15 to the inner coil 17 is placed via, for example, the outer transformer yoke 14 and an end face of the cylinder portion 13 of the inner frame 6. When the crossover wire 31 is formed in this way, the length of the crossover wire 31 can be shortened, and a damage due to vibrations or a wind pressure can be suppressed to a small degree.

When a recessed wiring groove (not shown) is disposed and embedded, damage can be further reduced.

The outer and inner portions 21 and 11 of the resolver body 10, and the outer and inner portions 9 and 20 of the rotary transformer 8 are continuously placed in a space between a face of the disk portion 12 and that of the annular plate portion 22.

(Case Where Inner Frame is Fixed: Inner Stator Type)

In the case where the inner frame 6 is fixed to a stationary member (not shown), a shaft (not shown) or a rotating counter member is fixed to the inner cylinder portion 23 of the outer frame 7, and the shaft or the like is rotatably fixed to the inner frame 6 or a support member (not shown). At this time, as shown in FIG. 1B, the rotary transformer 8 and the resolver body 10 are continuously placed in the space between the face of the disk portion 12 and that of the annular plate portion 22.

In this example, the outer portion 9 of the rotary transformer 8 functions as a primary side of a transformer, and the inner portion 20 of the rotary transformer 8 functions as a secondary side of the transformer.

The outer portion 21 of the resolver body 10 functions as an excitation side, and the inner portion 11 of the resolver body 10 functions as a detection (output) side.

A crossover wire (not shown) elongating from the inner transformer coil 26 of the inner portion 20 of the rotary transformer 8 functioning as the secondary side of the transformer, to the outer coil 28 of the outer portion 21 of the resolver body 10 functioning as the excitation side is extended along a side face of the annular plate portion 22 of the outer frame 7. As required, a through hole is formed in the annular plate portion 22, and the crossover wire is placed on a different side face.

When a recessed wiring groove is formed on the side face of the annular plate portion 22 and the crossover wire is embedded and fixed by a resin, a wiring structure resistant to a wind pressure and vibrations can be obtained.

(Case Where Outer Frame is Fixed: Outer Stator Type)

In the case where the outer frame 7 is fixed to a support member (not shown), a shaft (not shown) or a rotating counter member is fixed to the disk portion 12 of the inner frame 6, and the shaft or the like is rotatably fixed to the support member (not shown). At this time, as shown in FIG. 1B, the rotary transformer 8 and the resolver body 10 are continuously placed in the space between the face of the disk portion 12 and that of the annular plate portion 22.

In this example, the inner portion 20 of the rotary transformer 8 functions as a primary side of a transformer, and the outer portion 9 of the rotary transformer 8 functions as a secondary side of the transformer.

The inner portion 11 of the resolver body 10 functions as an excitation side, and the outer portion 21 of the resolver body 10 functions as a detection (output) side.

The crossover wire 31 elongating from the outer transformer coil 15 of the outer portion 9 of the rotary transformer 8 functioning as the secondary side of the transformer, to the inner coil 17 of the inner portion 11 of the resolver body 10 functioning as the excitation side is extended along, for example, the outer transformer yoke 14 and a side face of the cylinder portion 13 of the inner frame 6. The outer portion 9 functioning as the secondary side of the rotary transformer 8 is disposed on one side face so as to sandwich the cylinder portion 13 of the inner frame 6. The inner portion 11 functioning as the excitation side of the resolver body 10 is disposed on the other side face. The crossover wire elongating from the secondary side of the rotary transformer 8 to the excitation side of the resolver body 10 is placed via, for example, the outer transformer yoke 14 and the end face of the cylinder portion 13 of the inner frame 6. Therefore, the crossover wire can be placed by a short distance, and influences on the crossover wire due to a wind pressure and vibrations can be suppressed.

(Modification)

The resolver unit 1 shown in FIGS. 1A and 1B has the configuration in which, with respect to the cylinder portion 13 of the inner frame 6, the inner and outer portions 20 and 9 of the rotary transformer 8 are disposed on the radially inner side, and the inner and outer portions 11 and 21 of the resolver body 10 are disposed on the radially outer side. FIG. 1C is a sectional view showing an example in which the arrangement of FIG. 1B is modified. FIG. 1C is a sectional view showing only a section in the same manner as FIG. 1B.

Unlike the configuration of FIG. 1B, with respect to the cylinder portion 13 of the inner frame 6, the inner and outer portions 11 and 21 of the resolver body 10 may be disposed on the radially inner side, and the inner and outer portions 20 and 9 of the rotary transformer 8 may be disposed on the radially outer side.

[Embodiment 2]

(Multiplexing 1)

(Housing Example 1)

The multiplexed resolver of the invention is multiplexed by coupling together an arbitrary number of single-unit resolver units shown in FIGS. 1A and 1C in the direction of the shaft or the housing which will be described below.

Figure 2:
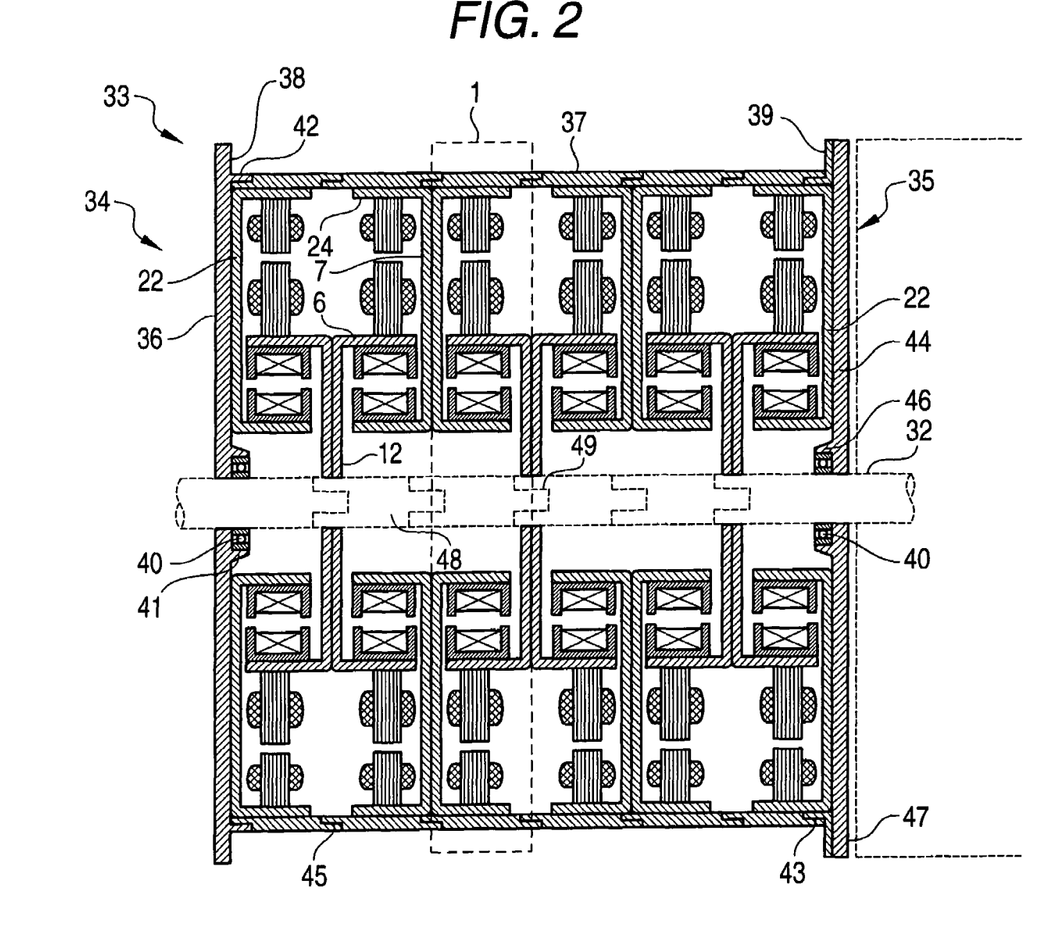
FIG. 2 is a sectional view of a multiplexed resolver using the resolver unit 1 of FIGS. 1A and 1B.

FIG. 2 is a sectional view of a multiplexed resolver using the resolver unit 1 of FIGS. 1A and 1B.

A housing 33 is configured by an upper housing 34 and a lower housing 35.

The upper housing 34 is configured by an upper plate portion 36 which is substantially planar, and a cylindrical sidewall portion 37.

The upper plate portion 36 has a recess 41 which houses a bearing 40, in the periphery of a center hole, a cylindrical thread portion 42 is projected from the vicinity of the outer periphery, and an upper flange 38 for attachment and coupling is provided in the periphery of the outer side.

The sidewall portion 37 has a length corresponding to one stage of the resolver unit 1, and a cylindrical thread portion 45 is disposed in the both axial ends.

An arbitrary number of sidewall portions 37 can be coupled by the thread portions 45. When one sidewall portion 37 is formed, a resolver is constituted.

By contrast, the lower housing 35 has: a substrate portion 44 which is planar in the same manner as the upper plate portion 36; a recess 46 which houses the bearing 40, in the periphery of a center hole of the substrate portion 44; and a substrate flange 47 for attachment and coupling, in the periphery of the outer side of the substrate portion 44.

In a shaft 32, a required number of approximately columnar bodies 48 each having a length corresponding to the axial length of the resolver unit 1 are screwingly coupled by thread portions 49.

A lower flange 39 of the upper housing 34, and the substrate flange 47 of the lower housing 35 are secured to each other by screwing or welding under the state where they are mutually positioned. The axial length of the sidewall portion 37 is an arbitrary integer multiple of the length of the single-unit resolver unit 1.

A side face of the disk portion 12 is positioned on one side face of the upper plate portion 36, and that of the substrate portion 44.

An arbitrary number of resolver units 1 to which the shaft 32 is fixed are attached and positioned in a space of the side wall portion 37, and at the same time the shaft 32 which couple the arbitrary number of resolver units 1 is rotatably passed through and supported by the bearings 40, 40 housed in the upper plate portion 36 and the substrate portion 44.

When the resolver units 1 are attached into the upper housing 34, adjacent resolver units 1, 1 are coupled together by one combination of the annular plate portions 22, 22 or the disk portions 12, 12, and the next adjacent resolver units 1, 1 are coupled together by a combination different from the combination of the above coupling. Then, a required number of resolver units are similarly coupled together while the combinations are sequentially alternately changed. Specifically, a step of combining the disk portions 12 of the inner frames 6 in a back to back relationship, and that of combining the annular plate portions 22 of the outer frames 7 in a back to back relationship are sequentially combined to conduct multiplexing.

In this case, the shaft 32 is secured to the disk portions 12 of the inner frames 6, and the outer cylinder portions 24 of the outer frames 7 are fixed to the cylindrical sidewall portion 37. One of the shaft 32 and the housing 33 is fixed, and the other is rotated. The housing 33 may be fixed to the above-mentioned arbitrary support member (not shown) other than the resolver.

[Embodiment 3]

(Multiplexing 2)

Figure 3A:
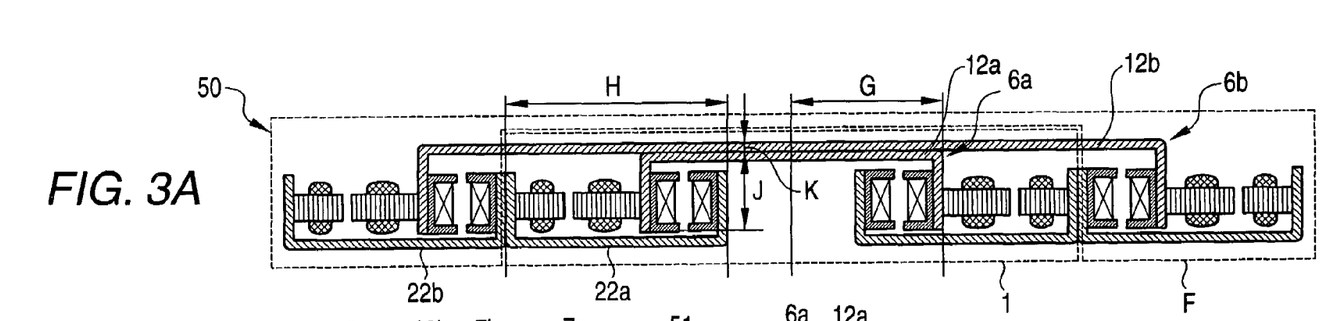
FIGS. 3A to 3C are sectional views of another multiplexed resolver of the invention.
Figure 3B:
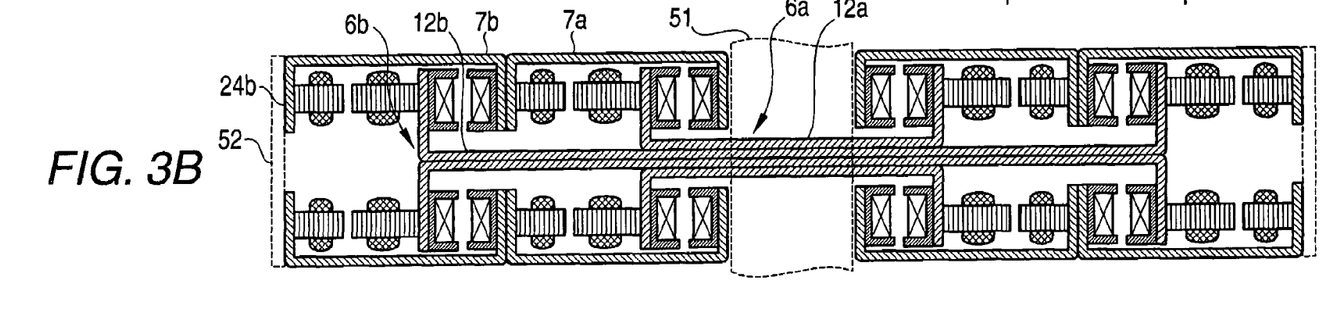
Figure 3C:
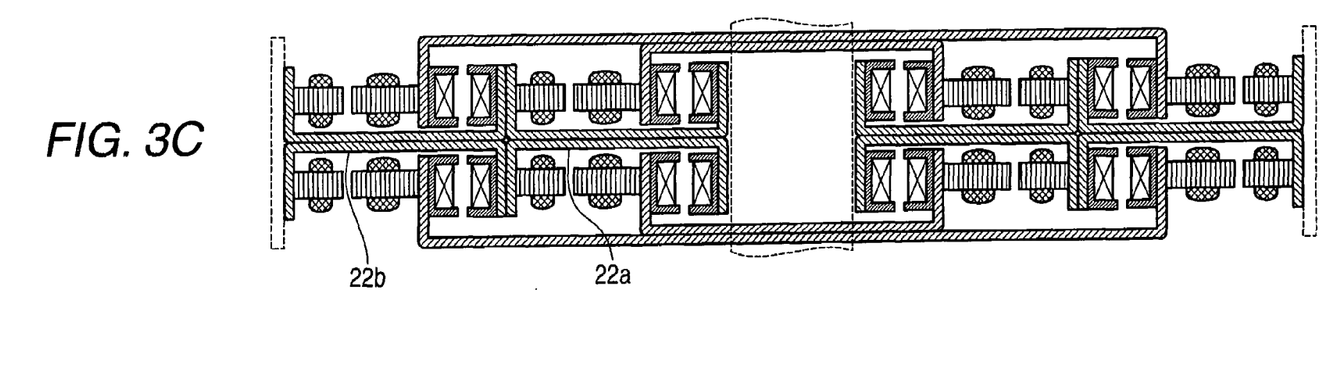

FIGS. 3A to 3C are sectional views of another multiplexed resolver of the invention.

FIG. 3A is a sectional view of a duplexed resolver of the invention which is duplexed in a radial direction.

The other multiplexed resolver of the invention is multiplexed by radially coupling the single-unit resolver unit 1 shown in FIGS. 1A and 1B and a modified resolver unit F in which the configuration of the resolver unit 1 is partly modified, at an arbitrary number.

The duplexed resolver of FIG. 3A is configured by the resolver unit 1 shown in FIG. 1B, and the modified resolver unit F.

In the modified resolver unit F which can house the resolver unit 1, the radius of a disk portion 12b is made longer than the radius G of a disk portion 12a of an inner frame 6a of the resolver unit 1 by the length (increment) H of an annular plate portion 22a to be (G+H), and the length J of the cylinder portion is (J+the thickness (increment) K of the disk portion).

In accordance with the degree of mulitplexing, for example, n multiplexing where n is an arbitrary positive integer, then, the increments in the duplexing are increased by n times, thereby forming the whole shape. The radial length of the annular plate portion 22a is constant.

[Embodiment 4]

(Multiplexing 3)

FIG. 3B is a sectional view of a multidirectional multiplexed resolver of the invention in which a duplexed resolver 50 shown in FIG. 3A and duplexed in a radial direction is used as a unit, and the disk portions of the inner frames are coupled together in the direction of the shaft or the housing.

FIG. 3C is a sectional view of a multidirectional multiplexed resolver of the invention in which the duplexed resolver 50 shown in FIG. 3A and duplexed in a radial direction is used as a unit, and the annular plate portions of the outer frames are coupled together in the direction of the shaft or the housing.

In the coupling, a shaft 51 is secured to the disk portions 12a, 12b of the inner frames 6a, 6b, and an outer cylinder portion 24b of an outer frame 7b is fixed to a sidewall portion 52 of a cylindrical housing. One of the shaft 51 and the housing is set to a stationary side, and the other is set to a rotary side. The shaft 51 and the housing are rotatably fixed to an arbitrary support member (not shown).

The duplexed resolvers are coupled by bonding together the disk portions 12a, 12b of the inner frames 6a, 6b as shown in FIG. 3B, or the annular plate portions 22a, 22b of the outer frame 7a, 7b as shown in FIG. 3C.

When multiplexing is conducted in this way, multiplexing can be conducted in an arbitrary direction, and hence the occupation space in which the resolver is housed can be reduced.

[Embodiment 5]

(Housing Example 2)

Housing example 2 is an example in which the inner frame 6 of the resolver unit 1 shown in FIG. 1B is set to the rotary side, and the outer frame 7 is set to the stationary side.

Figure 4A:
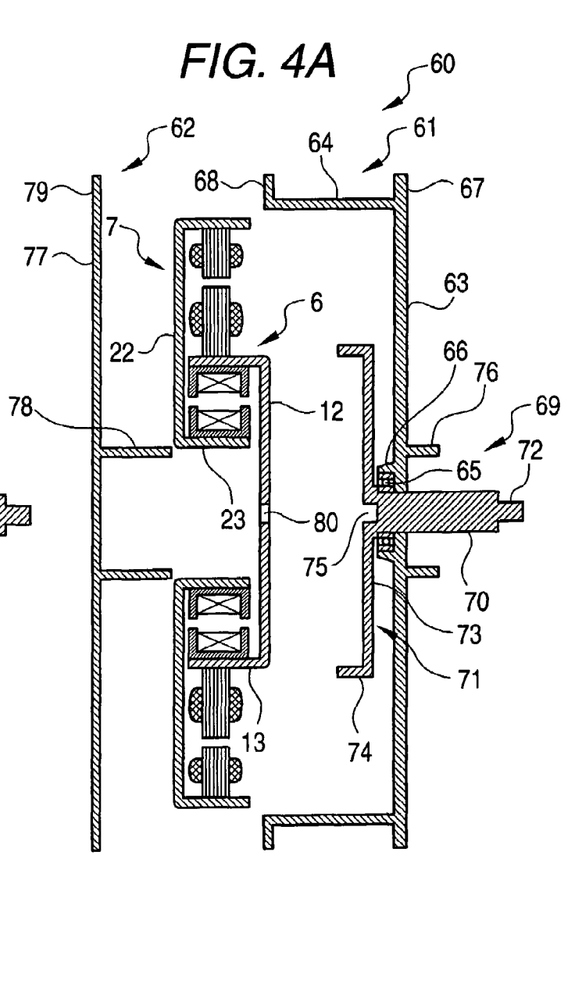
FIGS. 4A to 4C are sectional views showing only a section of Embodiment 5 of the invention taken along the center of a shaft, and shows Housing example 2.
Figure 4B:
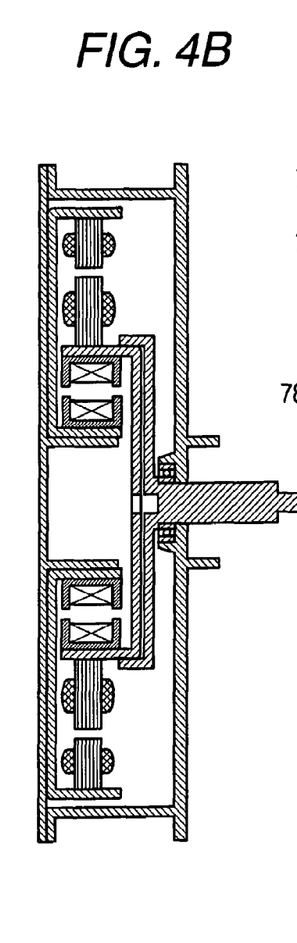
Figure 4C:
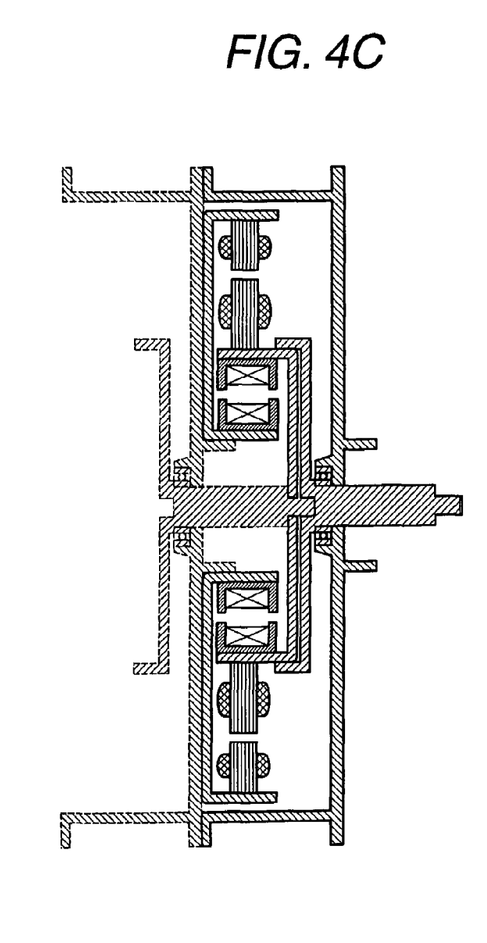

FIGS. 4A to 4C are sectional views showing only a section of Embodiment 5 of the invention taken along the center of the shaft, and shows Housing example 2.

FIG. 4A is an exploded sectional view of Housing example 2, FIG. 4B is an assembly sectional view of Housing example 2, and FIG. 4C is a sectional view of the case where Housing example 2 is multiplexedly mounted.

A housing 60 is configured by an upper housing 61 and a lower housing 62.

In the upper housing 61, a planar upper plate portion 63 and a cylindrical sidewall portion 64 are integrally disposed.

The upper plate portion 63 has an annular projection 76 in the periphery of a center hole, and a recess 66 which houses a bearing 65, and comprises an upper flange 67 for attachment and coupling, in the periphery of the outer side.

A free end of the sidewall portion 64 comprises a lower flange 68 for attachment and coupling which is opposed to the upper flange 67.

In a shaft 69 which is housed in the upper housing 61, a columnar coupling shaft portion 70 and an engagement arm portion 71 are integrally continuously disposed. The coupling shaft portion 70 has an engagement projection 72 at the tip end.

In the engagement arm portion 71, a disk-like engagement disk plate portion 73 and a cylindrical engagement cylinder portion 74 are integrally continuously disposed.

A recess 75 into which the engagement projection 72 at the tip end of the coupling shaft portion 70 is to be fitted is disposed at the center of the engagement disk plate portion 73.

The columnar coupling shaft portion 70 is rotatably pivoted by the bearing 65 which is housed in the upper plate portion 63 of the upper housing 61.

By contrast, the lower housing 62 has a substrate portion 77 which is planar, and a cylinder portion 78 which is perpendicularly disposed on the substrate portion 77.

A substrate flange 79 for attachment and coupling is disposed in the periphery of the outer side of the substrate portion 77.

A hole 80 through which the engagement projection 72 at the tip end of the shaft 69 is to be passed is formed in the disk portion 12 of the inner frame 6 of the resolver unit 1.

The lower flange 68 of the upper housing 61, and the substrate flange 79 of the lower housing 62 are secured to each other by screwing or welding under the state where they are mutually positioned. The axial length of the sidewall portion 64 is basically equal to the length of the single-unit resolver unit 1. Alternatively, the length of the sidewall portion 64 may be an arbitrary integer multiple of the length of the single-unit resolver unit 1.

The engagement cylinder portion 74 is configured so as to have an inner diameter which is equal to the outer diameter of the disk portion 12 of the inner frame 6. Therefore, the engagement cylinder portion 74 is fitted onto the disk portion 12 of the inner frame 6.

The cylinder portion 78 of the lower housing 62 is fitted into the inner cylinder portion 23 of the outer frame 7, thereby enabling the cylinder portion 78 and the inner cylinder portion 23 to be easily mutually positioned.

The process of assembling the state of FIG. 4B from that of FIG. 4A is conducted in the following manner.

(a1) First, the cylinder portion 13 of the inner frame 6 is fitted and secured into the engagement arm portion 71 of the shaft 69.

(a2) Next, while the cylinder portion 78 of the lower housing 62 is fitted into the inner cylinder portion 23 of the outer frame 7, the annular plate portion 22 of the outer frame 7 is placed on the substrate portion 77 of the lower housing 62.

(a3) Finally, the lower flange 68 of the upper housing 61, and the substrate flange 79 of the lower housing 62 are positioned and secured to seal an open end of the upper housing 61.

The process of assembling the multiplexed state of FIG. 4C is conducted in the following manner.

(b1) First, the initial upper housing 61 is placed, and the cylinder portion 13 of the inner frame 6 is fitted and secured into the engagement arm portion 71 of the shaft 69 which is attached to the upper housing 61.

(b2) Next, the outer cylinder portions 24 of the outer frames 7 is fitted, positioned, and fixed to the sidewall portion 64 of the upper housing 61.

(b3) Then, the next upper housing 61 is attached to the initial upper housing 61 in the following manner:

(b3-1) the engagement projection 72 of the next shaft 69 is fitted, positioned, and secured to the recess 75 of the engagement arm portion 71 of the shaft 69;

(b3-2) the annular projection 76 of the upper plate portion 63 of the next upper housing 61 is butted against and positioned to the inner cylinder portion 23 of the outer frame 7; and (b3-3) the lower flange 68 of the initial upper housing 61 is positioned and secured to the upper flange 67 of the next upper housing 61.

(b4) The above steps are sequentially executed a required number of times in accordance with the degree of multiplexing.

(b5) Finally, the steps (a2) and (a3) above are implemented.

Alternatively, the shaft may be fixed, and the housing is rotated contrary to the above-described example.

(Effects of Embodiment 5)

In Embodiment 5, the housing which, as shown in FIG. 4, is configured by the shaft, the upper housing, and the lower housing is used, whereby the single-unit resolver unit 1 can be operably housed in the housing.

An arbitrary number of resolver units 1 can be integrally incorporated in an interlockingly operable manner to constitute a multiplexed resolver, by combining arbitral numbers of shafts, upper housings, and lower housings.

Namely, a single resolver and a multiplexed resolver can be adequately constituted by combining the shaft(s), the upper housing(s), and the lower housing(s) in predetermined relationships.

[Embodiment 6]

(Housing Example 3)

Housing example 3 is an example in which, contrary to Housing example 2, the inner frame 6 of the resolver unit 1 shown in FIG. 1B is set to the stationary side, and the outer frame 7 is set to the rotary side.

Figure 5A:
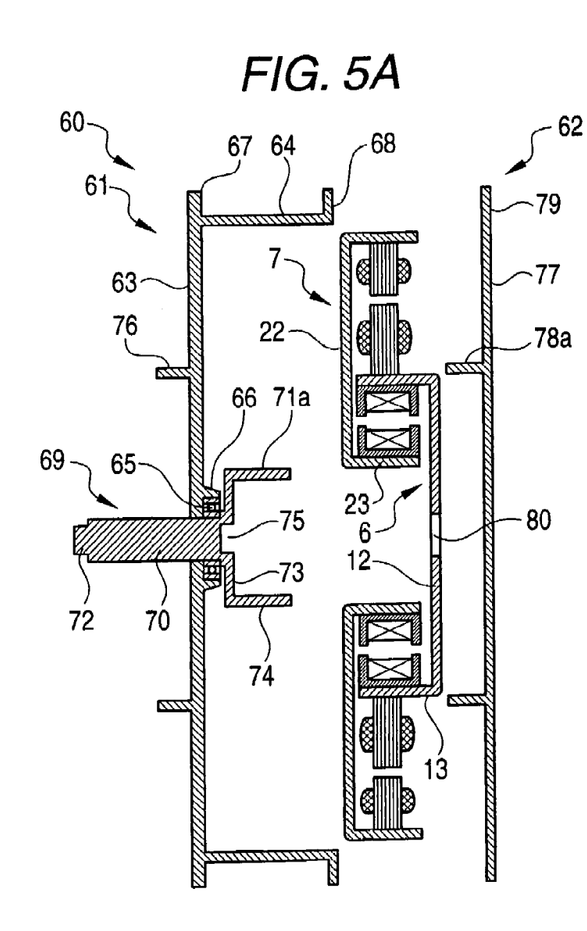
FIGS. 5A to 5C are sectional views showing only a section of Embodiment 6 of the invention taken along the center of the shaft, and shows Housing example 3.
Figure 5B:
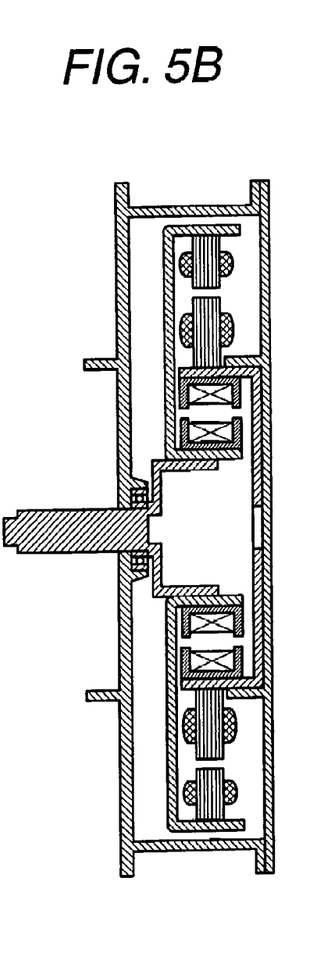
Figure 5C:
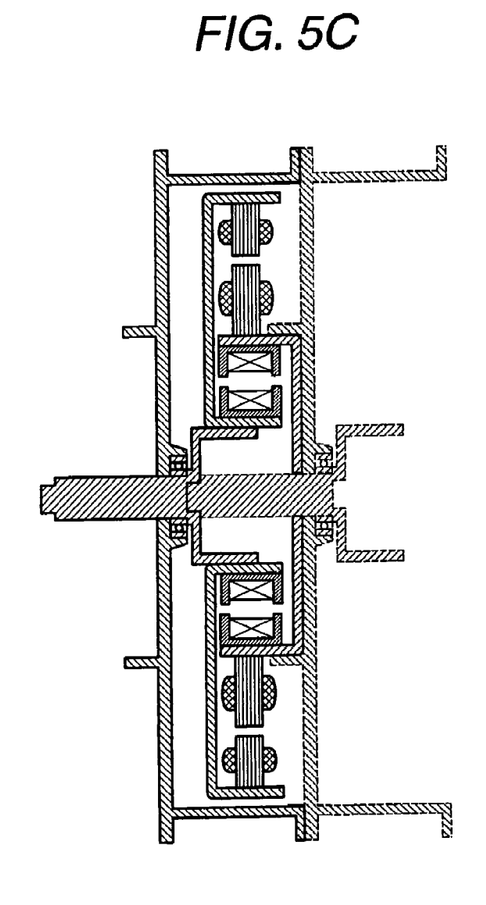

FIGS. 5A to 5C are sectional views showing only a section of Embodiment 6 of the invention taken along the center of the shaft, and shows Housing example 3.

FIG. 5A is an exploded sectional view of Housing example 3, FIG. 5B is an assembly sectional view of Housing example 3, and FIG. 5C is a sectional view of the case where Housing example 3 is multiplexedly mounted.

Housing example 3 of FIGS. 5A to 5C is different from Housing example 2 of FIGS. 4A to 4C in that an engagement arm portion 71a of the shaft 69 is fitted and fixed to the inner cylinder portion 23 of the outer frame 7, and that a cylinder portion 78a of the lower housing 62 is fitted and fixed to the cylinder portion 13 of the inner frame 6. The other components other than these points are identical with those of Housing example 2. Therefore, they are denoted by the same reference numerals, and their description is omitted.

Alternatively, the shaft may be fixed, and the housing is rotated contrary to the above-described example.

(Effects of Embodiment 6)

In Embodiment 6, the housing which, as shown in FIGS. 5A to 5C, is configured by the shaft, the upper housing, and the lower housing is used, whereby the single-unit resolver unit 1 can be operably housed in the housing.

An arbitrary number of resolver units 1 can be integrally incorporated in an interlockingly operable manner to constitute a multiplexed resolver, by combining arbitral numbers of shafts, upper housings, and lower housings.

Namely, a single resolver and a multiplexed resolver can be adequately constituted by combining the shaft(s), the upper housing(s), and the lower housing(s) in predetermined relationships.

What is claimed is:

1. A resolver unit comprising:
   an inner frame in which a cylinder portion is continuously disposed on a periphery of a disk portion;
   an outer frame in which an outer cylinder portion is continuously disposed on an outer periphery of an annular plate portion, and an inner cylinder portion is continuously disposed on an inner periphery of said annular plate portion;
   a rotary transformer comprising an outer portion and an inner portion, wherein said outer portion comprises an annular outer transformer coil and an annular outer transformer yoke, and said inner portion comprises an annular inner transformer coil and an annular inner transformer yoke;
   a resolver body comprising an inner portion and an outer portion, wherein said inner portion comprises a plurality of inner magnetic pole portions having an inner coil on an annular inner yoke, and said outer portion comprises a plurality of outer magnetic pole portions having an outer coil on an annular outer yoke,
   wherein said outer and inner portions of said rotary transformer are paired and opposingly placed,
   said outer and inner portions of said resolver body are paired and opposingly placed,
   one of said outer portion of said rotary transformer and said outer portion of said resolver body is disposed on a radially inner side face of said cylinder portion of said inner frame, one of said inner portion of said rotary transformer and said inner portion of said resolver body is disposed on a radially outer side face of said inner cylinder portion of said outer frame, said one being paired with and opposed to said outer portion which is disposed on said radially inner side face of said cylinder portion of said inner frame, the other one of said inner portion of said rotary transformer and said inner portion of said resolver body is disposed on a radially outer side face of said cylinder portion of said inner frame, said other one being not paired with said outer portion which is disposed on said radially inner side face of said cylinder portion of said inner frame, and one of said outer portion of said rotary transformer and said outer portion of said resolver body is disposed on a radially inner side face of said outer cylinder portion of said outer frame, said one being paired with and opposed to said inner portion which is disposed on said radially outer side face of said cylinder portion of said inner frame.

2. The resolver unit according to claim 1, wherein said outer and inner portions of said resolver body, and said outer and inner portions of said rotary transformer are continuously placed in a space between a face of said disk portion and a face of said annular plate portion.

3. A resolver which uses a resolver unit according to claim 1, wherein a shaft is disposed in said disk portion, said outer cylinder portion is disposed in a housing, and said shaft is rotatably disposed in said housing.

4. The resolver according to claim 3, wherein said housing comprises:

an upper plate portion having an annular projection and an upper flange;

an upper housing which upstands on said upper plate portion, and which comprises a side wall portion having a lower flange in an open end;

a cylinder portion to which one of said inner and outer frames of said resolver unit is fixed; and a lower housing having a substrate flange opposed to said lower flange, wherein a shaft is disposed on said upper plate portion, and fixes the other one of said inner and outer frames of said resolver unit.

5. A resolver according to claim 4, wherein an arbitrary number of said upper housings in each of which said resolver unit is housed in an internal space are coupled together, and an open end of a last one of said upper housings is sealed by said lower housing.

6. A resolver in which multiple resolver units according to claim 1 are combined to integrally operate, wherein adjacent ones of resolver units are coupled together at one of said annular plate portions and said disk portions, next adjacent ones of resolver units are coupled together at the other one of said annular plate portions and said disk portions, and then a required number of resolver units are similarly coupled together.

7. A resolver in which multiple resolver units according to claim 1 are combined to integrally operate, wherein in accordance with a degree of multiplexing, a required number of unit configurations each of which includes said outer frame, and in each of which placement relationships among said outer and inner portions of said resolver body, and said outer and inner portions of said rotary transformer that are continuously placed in a space between a face of said disk portion and a face of said annular plate portion are fixed are continuously disposed in a radial direction, a radius of said disk portion of said inner frame is elongated in accordance with a radial outward order of said unit configuration, and a width of said cylinder portion of said inner frame is increased by a degree of a plate thickness in accordance with the radial outward order of said unit configuration.

8. A resolver wherein multiple resolvers according to claim 7 are disposed in the axial direction.

* * * * *